(12) United States Patent
Iwamura

(10) Patent No.: US 6,501,515 B1
(45) Date of Patent: *Dec. 31, 2002

(54) REMOTE CONTROL SYSTEM

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/170,871

(22) Filed: Oct. 13, 1998

(51) Int. Cl.[7] ................................................ H04N 5/44
(52) U.S. Cl. .................... 348/734; 348/155; 348/169; 345/157; 345/158
(58) Field of Search ................... 348/734, 169, 348/700, 155; 345/156, 157, 158, 145; H04N 5/44, 2/18, 5/225

(56) References Cited

U.S. PATENT DOCUMENTS

| | | | |
|---|---|---|---|
| 4,988,981 A | * 1/1991 | Zimmerman et al. | 345/158 |
| 5,444,791 A | * 8/1995 | Kamada et al. | 348/155 |
| 5,473,364 A | * 12/1995 | Burt | 348/155 |
| 5,594,469 A | * 1/1997 | Freeman et al. | 345/158 |
| 5,617,312 A | * 4/1997 | Iura et al. | 345/157 |
| 5,808,678 A | * 9/1998 | Sakaegi | 348/334 |
| 5,991,428 A | * 11/1999 | Taniguchi | 348/155 |
| 6,191,773 B1 | * 2/2001 | Maruno et al. | 345/158 |

* cited by examiner

Primary Examiner—John Miller
Assistant Examiner—Trang U. Tran
(74) Attorney, Agent, or Firm—Fitch, Even, Tabin & Flannery

(57) ABSTRACT

An electronic appliance remote controller which includes a display screen (which may be part of the appliance, e.g. a TV screen) for displaying icons representing possible operations of the electronic appliance, and a motion detector circuit for detecting a motion within a field of view of the motion detector circuit. The motion detector circuit detects a predetermined motion of a moving object within the field of view as an indication that a remote control operation is to be started and, thereafter, tracks the movement of the object. The motion detector circuit outputs a cursor control signal representative of the motion of the object. A control circuit, connected to the display screen, the electronic appliance, and the motion detector circuit and supplied with the cursor control signal, controls the display screen to display a movable visual indicator, e.g. a cursor, whose own motion tracks the movement of the moving object and the electronic appliance to perform operations corresponding to the icons selected by the user using the visual indicator.

39 Claims, 9 Drawing Sheets

REMOTE CONTROL SYSTEM

BACKGROUND OF THE INVENTION

1. Field of the Invention

This invention relates to a remote control commander for an electronic appliance, such as a television set, and more particularly to an optical motion sensing remote control system for an electronic appliance.

2. Related Art

An IR (Infra Red) remote controller is a common means to control a TV from a distance. However, existing remote controllers have some drawbacks. They are easy to lose. The user often mistakes a VCR controller for the TV controller. In fact, a lot of people have a great "remote controller collection". Also one has to learn which button is where on the controller. Remote controllers require batteries which have to be replaced periodically. If a TV could have a camera vision and read the user's gestures, no remote controller would be necessary. However, it is not easy for a TV to distinguish gestures from other moves in its camera view. One would not want the channel to change each time the user got up to fetch a snack from the kitchen, for example.

SUMMARY OF THE INVENTION

The above and other problems of prior art remote control system for electronic device are overcome by an remote control system for electronic device according to the present invention which includes a display screen (which may be part of the device, e.g. a TV screen) for displaying icons representing possible operations of the electronic device, and a motion detector circuit for detecting a motion within a field of view of the motion detector circuit. The motion detector circuit detects a predetermined motion of a moving object within the field of view as an indication that a remote control operation is to be started and, thereafter, tracks the movement of the object. The motion detector circuit outputs a cursor control signal representative of the motion of the object. A control circuit, connected to the display screen, the electronic device, and the motion detector circuit and supplied with the cursor control signal, controls the display screen to display a movable visual indicator, e.g. a cursor, whose own motion tracks the movement of the moving object and the electronic device to perform operations corresponding to the icons selected by the user using the visual indicator.

In a preferred embodiment, the motion detector circuit detects the selection of an icon by the user by detecting a predetermined motion pattern of the object when the visual indicator is coincident on the display screen with a particular icon. For example, the motion detector circuit detects the selection of an icon by the user by detecting a cessation of movement of the object for a predetermined period of time after the visual indicator is coincident on the display screen with a particular icon. The detected object can be, for example, the user's hand. The predetermined motion can be a circular hand movement.

In the preferred embodiment, the motion detector circuit includes a video camera and calculates a motion vector of each macro block between two adjacent video frames in a video output signal from the video camera. Each video frame includes a plurality of blocks, each containing vectors representative of detected motion of the object. Neighbor vectors with almost the same direction are grouped as one region. For each frame, the motion detector circuit, in determining whether to track an object, checks each region to determine if that region satisfies the conditions (a) that the vector made one rotation clockwise or counterclockwise and (b) the region returned to the start position where it used to be and locks onto that region if conditions (a) and (b) are both satisfied.

In order that the same general length of hand movement will control the visual indicator to move a consistent corresponding length of movement, the control circuit includes an automatic cursor sensitivity adjustment feature which automatically scales the extremes of the movement of the visual indicator to the extremes of the predetermined hand motion so that, for example, the same diagonal motion of the user's hand will cause the visual indicator to move just across the diagonal of the display screen regardless of whether the user is close to the motion detector circuit or far away.

A remote controlling method for an electronic device according to the invention includes the steps of visually displaying on a display screen such as a TV screen, icons representing possible operations of the electronic device (e.g. a TV), detecting a motion within a field of view, including detecting a first predetermined motion of a moving object within the field of view as an indication that a remote control operation is to be started and, thereafter, tracking the movement of the object an outputting a cursor control signal representative of the motion of the object. In response to the control signal, controlling the display screen to display a movable visual indicator, e.g. a cursor, whose movement tracks the movement of the moving object and further controlling the electronic device to perform operations corresponding to the icons selected by the user using the visual indicator. The first predetermined motion can be any hand movement, such as a circular movement or a diagonal hand movement, for example.

The step of detecting the selection of an icon by the user includes detecting a second predetermined motion pattern of the object when the visual indicator is coincident on the display screen with a particular icon. For example, the predetermined motion pattern could be a cessation of movement of the object for a predetermined period of time after the visual indicator is coincident on the display screen with the particular icon.

The motion detecting step uses a video camera in the preferred embodiment and includes calculating a motion vector of each macro block between two adjacent video frames in a video output signal from the video camera. Each video frame includes a plurality of blocks each containing vectors representative of detected motion of the object, wherein neighbor vectors with almost the same direction are grouped as one region. For each frame, the determination of whether to track an object is made by checking each region to determine if that region satisfies the conditions (a) that the vector made one rotation clockwise or counterclockwise and (b) the region returned to the start position where it used to be. That region is locked onto if conditions (a) and (b) are both satisfied.

In order that the same general length of hand movement will control the visual indicator to move a consistent corresponding length of movement, the remote controlling method according to the invention further includes a step of automatically adjusting the sensitivity of the visual indicator by the steps of automatically scaling the extremes of the movement of the visual indicator to the extremes of the predetermined hand motion so that, for example, the same diagonal motion of the user's hand will cause the visual indicator to move just across the diagonal of the display screen regardless of whether the user is close to the motion detector circuit or far away.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

The system according to the invention operates on the premise that a user does a special hand motion so that, for example, a system can easily detect and lock onto an image of the user's hand. Once the hand image is locked, the system electronically follows the hand's motion and moves a cursor on the system screen toward the same direction as the hand moves. The user can move the cursor by moving the hand like a PC mouse. Moving the cur user can choose a menu button from a plurality of buttons on the TV display. If the system loses track of the hand motion after locking, the system indicates a message to the user and lets the user do a special hand motion to re-lock and trace the motion.

To detect hand moves, motion vectors can be employed. A motion vector scheme is common in a motion picture experts group (MPEG) system. If the system has an MPEG encoder, its motion vector circuits can be shared. A large reduction in costs will then be possible.

Figure 1:
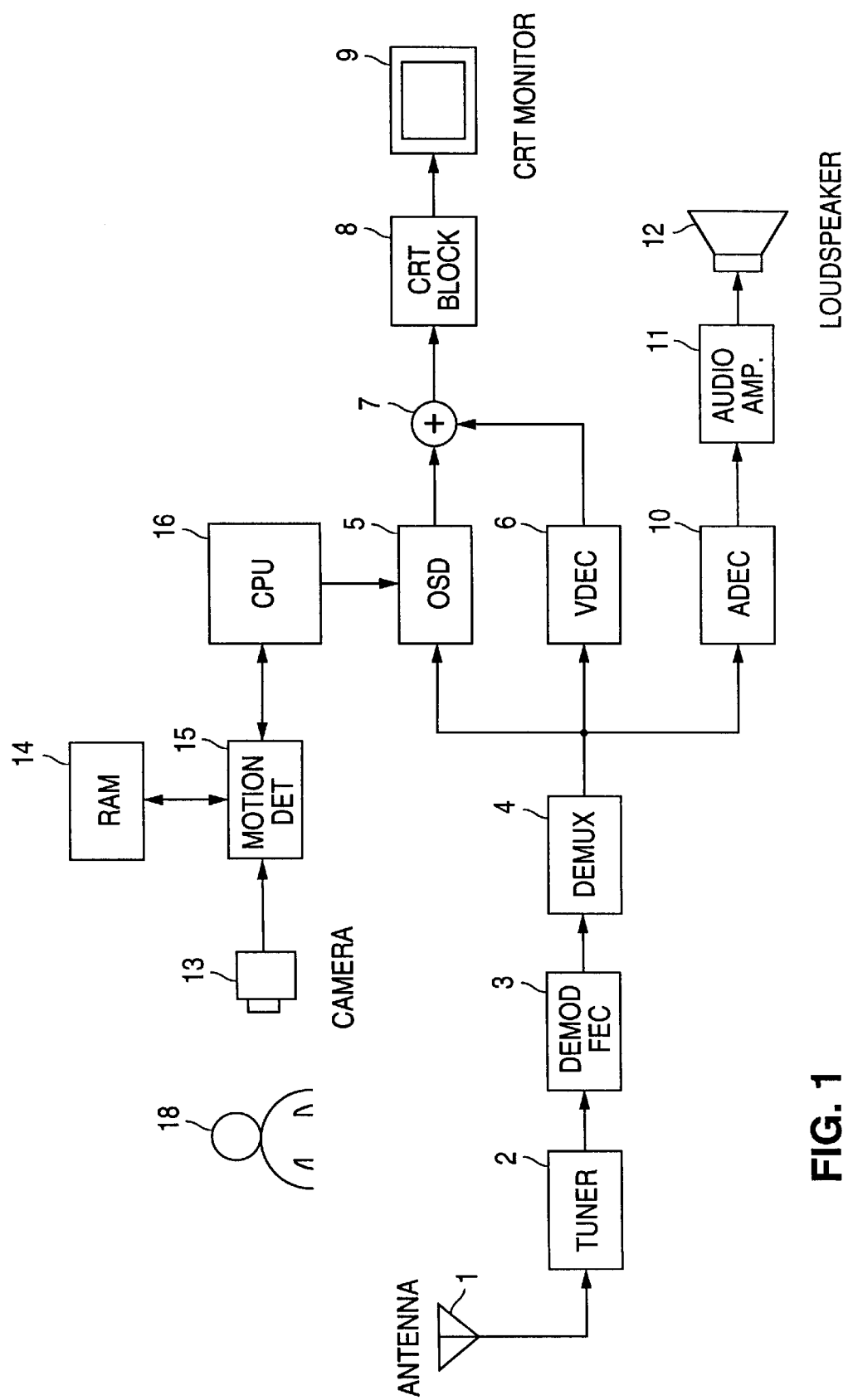
FIG. 1 is a block diagram of the motion sensing remote control system according to the invention.

Referring now to FIG. 1, a block diagram of the system is shown. The portion from blocks 1 to 12 is the same as a common digital TV set. The signal received by an antenna 1 is tuned in a tuner 2, demodulated and error-corrected in a demodulation and error correction block 3, and de-multiplexed in demultiplexer 4. Demultiplexed on screen display (OSD) data, video data and audio data are sent to OSD circuit 5, video decoder 6, and audio decoder 7, respectively. OSD data and the decoded video signal are mixed in a superimposer 7 and sent to a cathode ray tube (CRT) circuit 8 and displayed on CRT monitor 9. Decoded audio data is amplified in an amplifier 11 and sent to a loudspeaker 12.

Blocks 13 to 16 are the main portion of this invention. A camera 13, which can be mounted on the monitor 9, for example, captures images of a user 18 in front of the TV set and sends its images to a motion detector circuit 15. The motion detector circuit 15 compares the current video frame with a previous video frame stored in a RAM 14 and calculates a motion vector for each macro block of the video frame. A macro block size is, for example, 16×16 pixels. One frame consists of, for example, 22×18 macro blocks.

Figure 2:
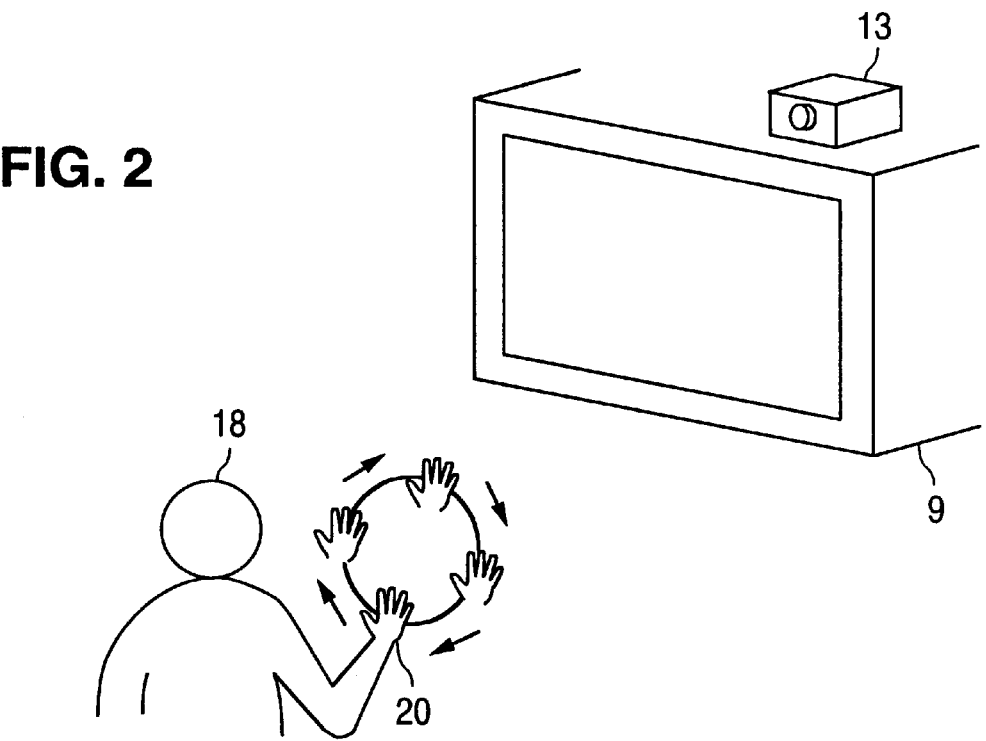
FIG. 2 is a diagrammatic illustration for use in explaining how the user uses a hand motion to cause the remote control system of FIG. 1 to recognize that a motion control signal is about to be made.
Figure 3:
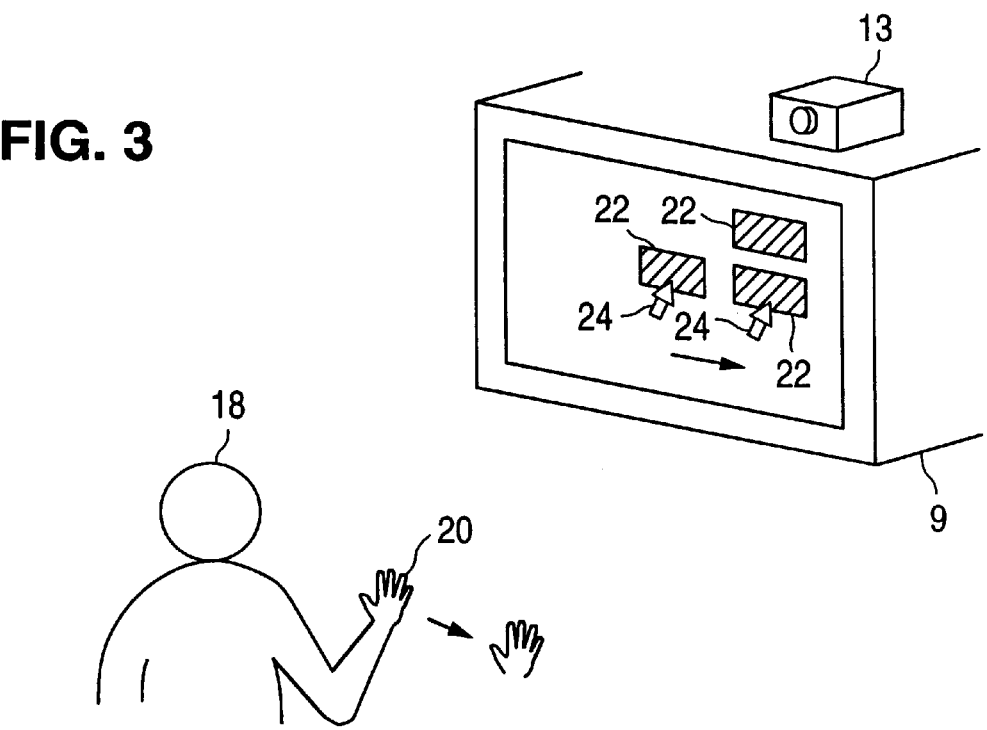
FIG. 3 is a diagrammatic illustration for use in explaining how the user causes the remote control system of FIG. 1 to move an on-screen cursor to follow the hand motion of the user.

When the user 18 wants to control the TV, the user 18 moves his or her hand 20 in a circular motion, so that it draws a circle in the air. (FIG. 2). The system distinguishes this unusual hand motion from other motions and senses that the user 18 wants to communicate. At that time, the system displays the menu button icons 22 on the CRT display. Once the system's motion detector circuit 15 captures the hand image, the motion detector circuit 15 locks the hand motion and a cursor 24 follows it. If the user 18 moves his or her hand 20 to the right, the cursor 24 on the CRT display moves right (24'). The hand 20 and the cursor 24 behave like a PC mouse and a cursor. Note that the system does not care about absolute position of the hand 20. The system senses only moving speed and direction of the hand 20 and moves the on screen cursor 24. When the cursor 24 comes to a menu button icon 22 the user 18 wants, the user 18 stops and holds the hand 20 there a couple of seconds. The motion detector circuit 15 of the system recognizes this action as the equivalent of a "button push" and executes the function the button icon 22 indicates. If no move is detected for a certain time, it is timed out. The menu disappears. The motion detector circuit 15 begins trying to detect another circular move again.

Figure 4:
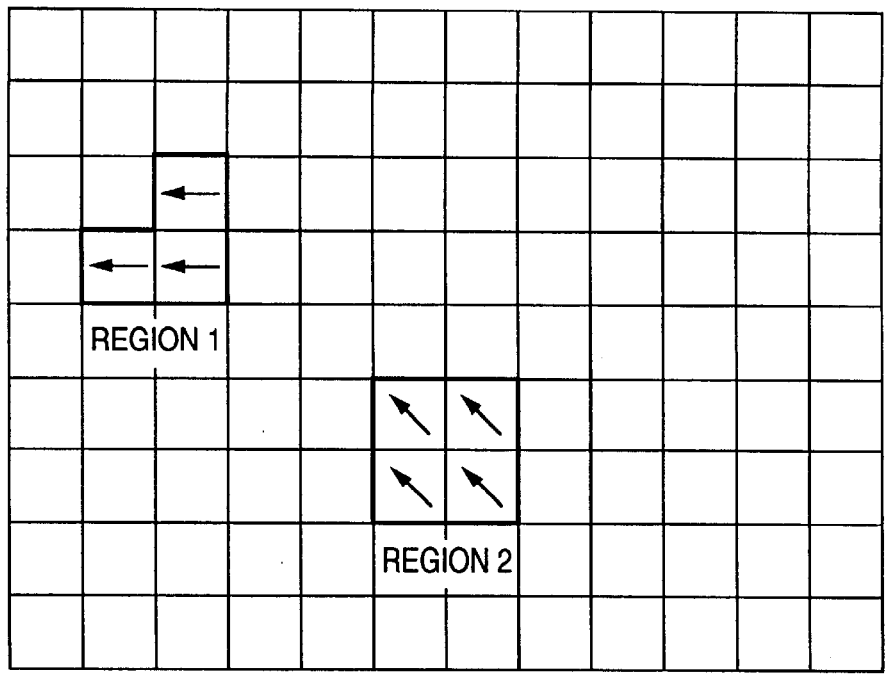
FIG. 4 is a diagram of a macro block in a video signal frame in which a motion is calculated by the remote control system of FIG. 1 and further depicts motion vectors as arrows.
Figure 5:
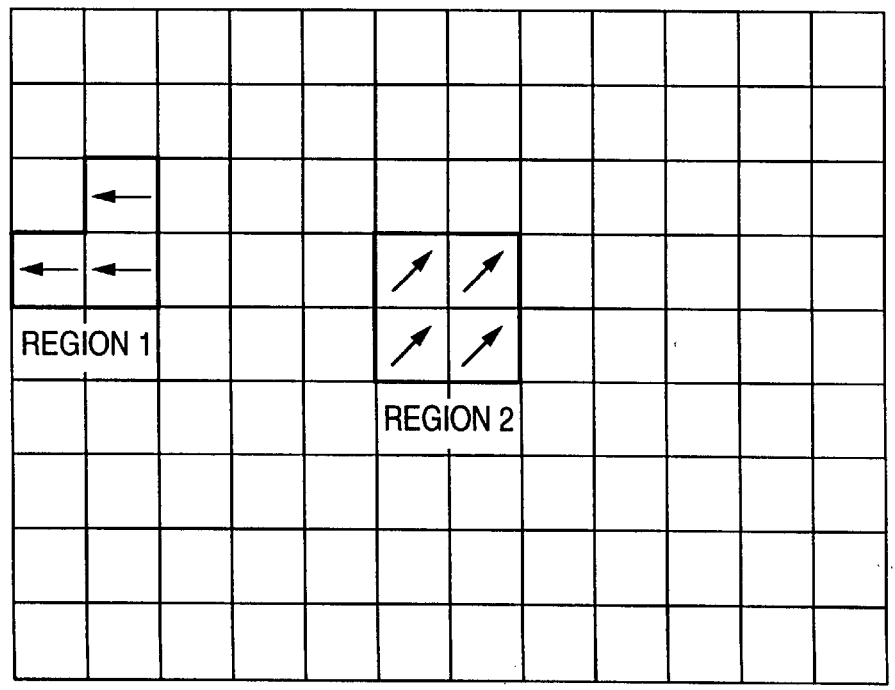
FIGS. 5–8 are each snapshots of vectors at an interval of one half a second.

The motion detector circuit 15 recognizes and locks the hand 20 image as follows. The motion detector circuit 15 calculates a motion vector of each macro block between two adjacent frames. Small vectors below a certain threshold are ignored. FIG. 4 shows whole macro blocks in a frame. For purposes of explanation and to make the figure simpler, the depicted macro blocks are less than the actual number and shown larger. Neighbor vectors with almost the same direction are grouped as one region. In FIG. 4, regions 1 and 2 are grouped. At this time, the motion detector circuit 15 does not know which region is the hand image. The motion detector circuit 15 repeats this procedure for every frame.

Figure 6:
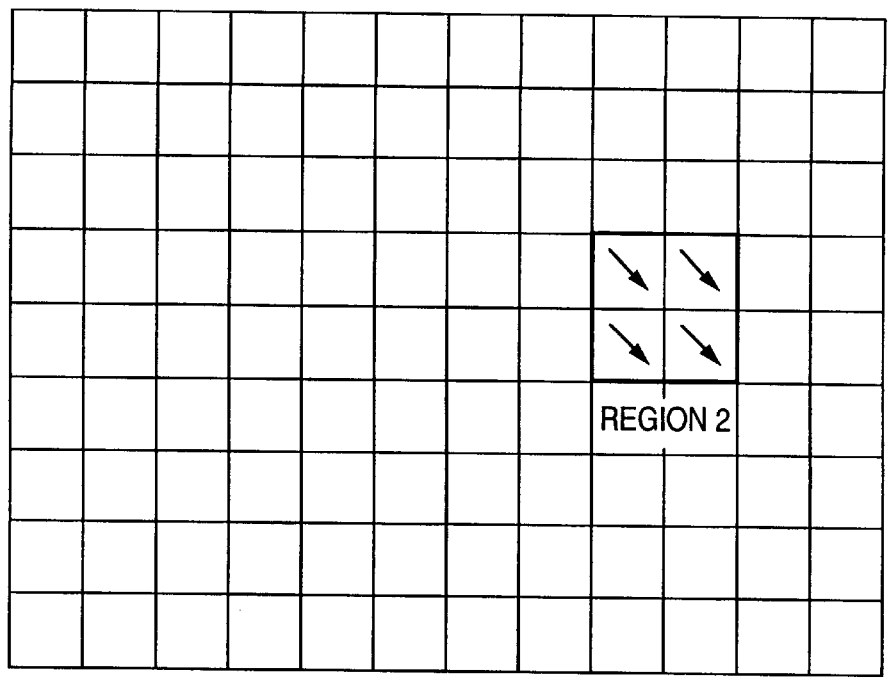
Figure 7:
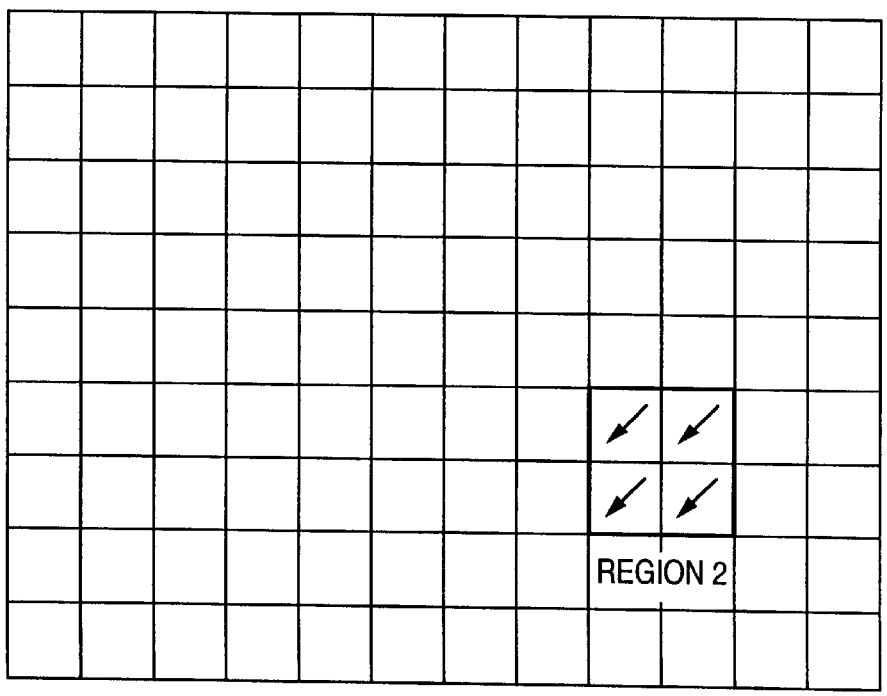

In the next frame, if there is a region that has almost the same position and vector direction as region 1, the region will succeed the named region 1. Other regions will be named in the same way. A new region 1 is given a new name. If a region in a previous frame does not find a successor, it is discarded. Each of FIGS. 5 to 8 indicates a snapshot of vectors at an interval of half a second. It takes one to three seconds to draw a circle. In FIG. 6, region disappeared and the motion detector circuit 15 judges region 1 is not the hand motion. Region 2 is still a candidate for the hand image. For every frame, the motion detector circuit 15 checks that each region satisfies the following two conditions:

(1) Did the vector make one rotation clockwise or counterclockwise?

(2) Did the region return to the start position where it used to be? If a region meets these conditions, the motion detector circuit 15 judges it is the hand image.

Figure 8:
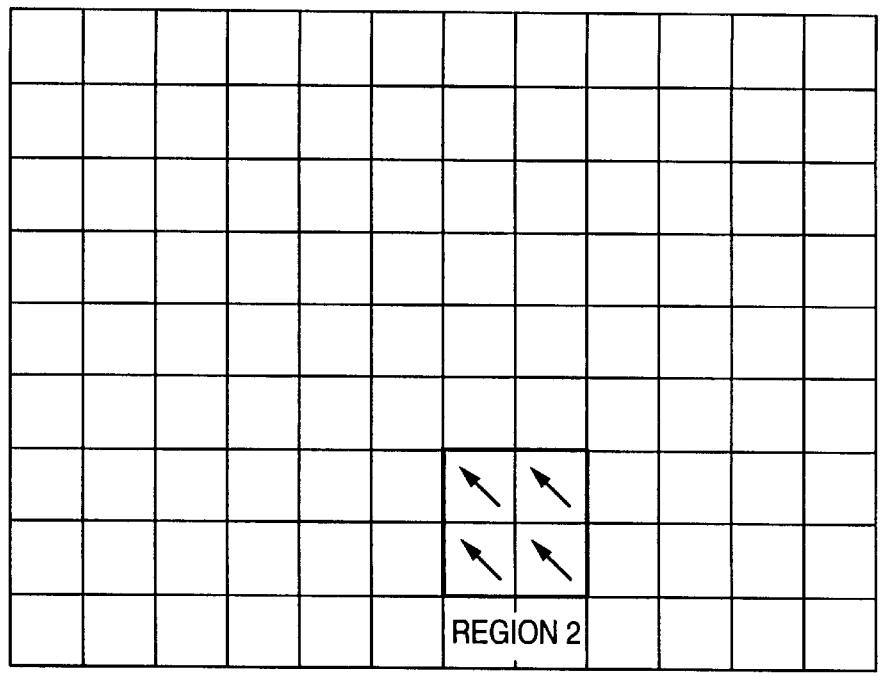
Figure 9:
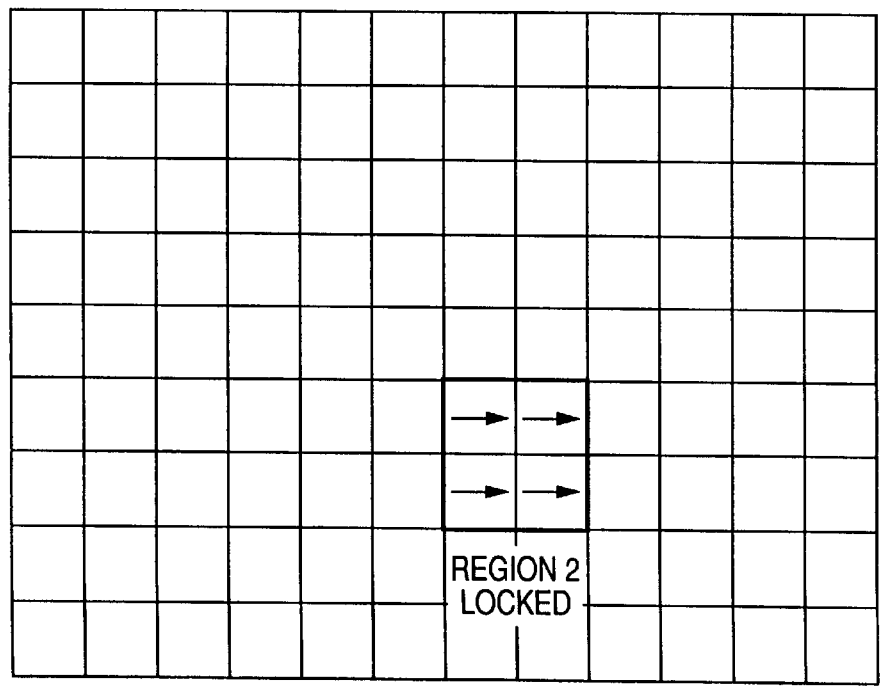
FIG. 9 is a snapshot wherein the remote control system of FIG. 1 has determined that the image is a hand image and locks onto the image.
Figure 10:
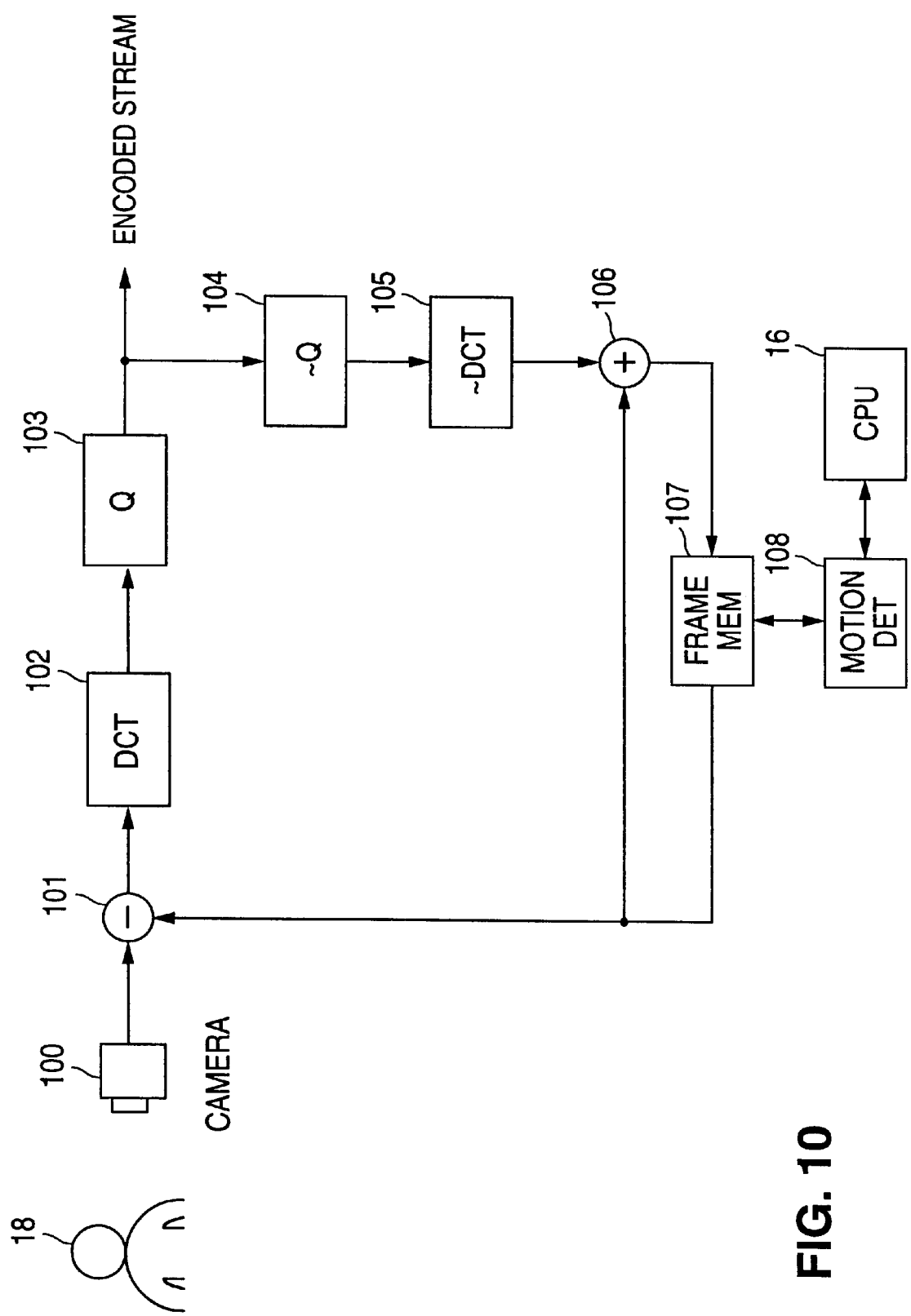
FIG. 10 is a block diagram of an alternative embodiment which makes use of an MPEG encoder of the electronic appliance.

In FIG. 8, region 2 is judged as the hand image. Then the motion detector circuit 15 locks on region 2 and follows its motion (FIG. 9). The motion detector circuit 15 lets CPU 16 know that the hand image has been locked and sends its motion information to CPU 16. Controlled by CPU 16, OSD 5 moves the cursor 24 on the CRT monitor 9 so that the cursor 24 follows the hand motion.

If the motion detector circuit 15 loses track of the hand 20, the motion detector circuit 15 informs the CPU 16 to cause the CRT 9 to display the message "Move your hand right". The user 18 follows the message. Then the motion detector circuit 15 causes the CPU to control the CRT 9 to display another message "Move your hand upward." The user 18 follows the message again. If the motion detector circuit 15 captures the image that moves right first and upward next, then the motion detector circuit 15 re-captures and locks on the hand image again.

Figure 12:
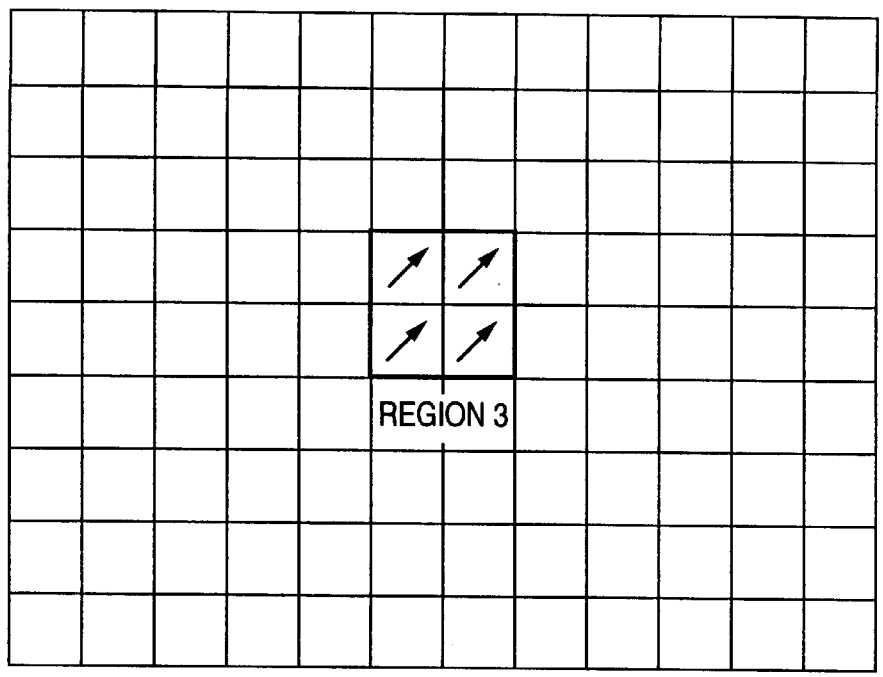
FIGS. 12 and 13 are each snapshots of macro blocks and motion vectors at an interval of one half a second of motion vectors detected by the remote control system of FIG. 1 for a hand motion shown in FIG. 11.
Figure 13:
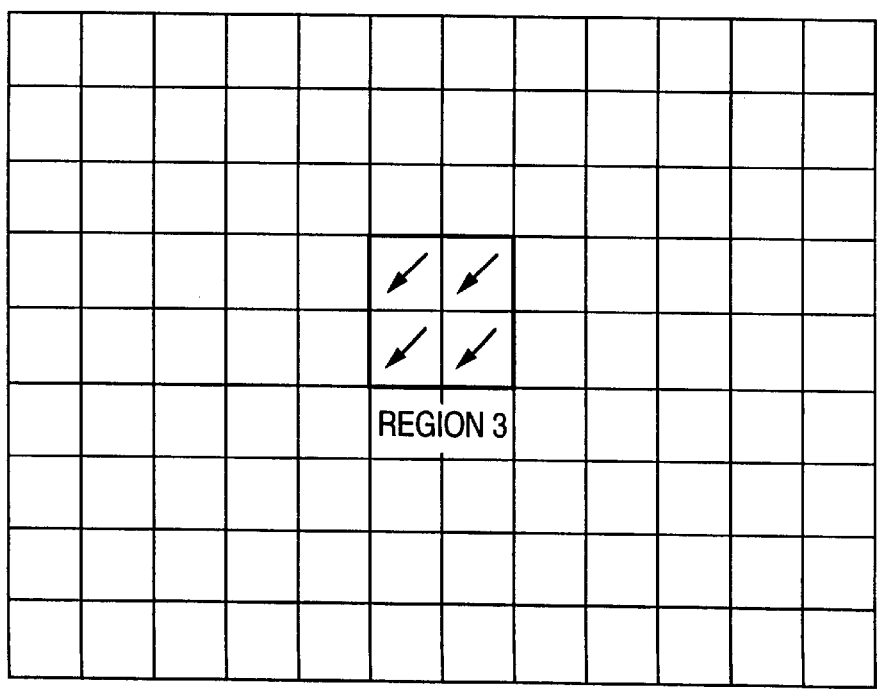

The special hand motion is not limited to a circular move. Any other special gesture will do. To let the TV know the menu button icon 22 is chosen, the user can do another special gesture instead of holding the hand 20 still. For example, as a variation of the circular hand motion, the user 18 may move the hand 20 several times (for example twice) toward diagonal direction, for example, lower left to upper right. (FIG. 11) When the hand 20 goes up, motion vectors point to the upper right (FIG. 12) region 3). When the hand 20 goes down, the motion vectors point to the lower left. (FIG. 13, region 3) The motion vectors point to the opposite direction as the hand 20 moves. Therefore, if there are motion vectors which point to a predetermined direction and change their direction oppositely, for example, three times (predetermined times) in a certain time period, the system judges that the user 18 has done the predetermined motion and locks onto the hand motion.

Compared with the circular motion shown in FIG. 2, this is an easier motion for the user 18 to make and also easier to detect for the system. A drawback is that such a motion is more likely to occur unintentionally than the circular motion and, thus, misdetection could occur more frequently. If the user 18 jiggles his or her leg, it could cause misdetection. It is a tradeoff.

Figure 14:
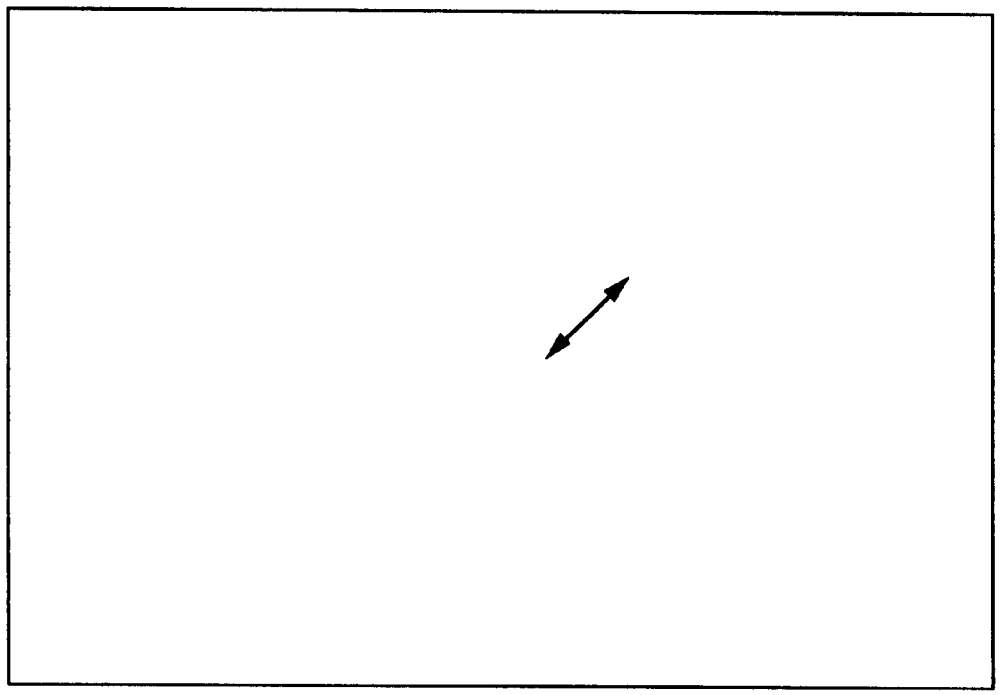
FIGS. 14 and 15 depict the user's diagonal hand motion as detected by the remote control system of FIG. 1 when the user is close to the TV (FIG. 14) and when the user is far from the TV (FIG. 15).
Figure 15:
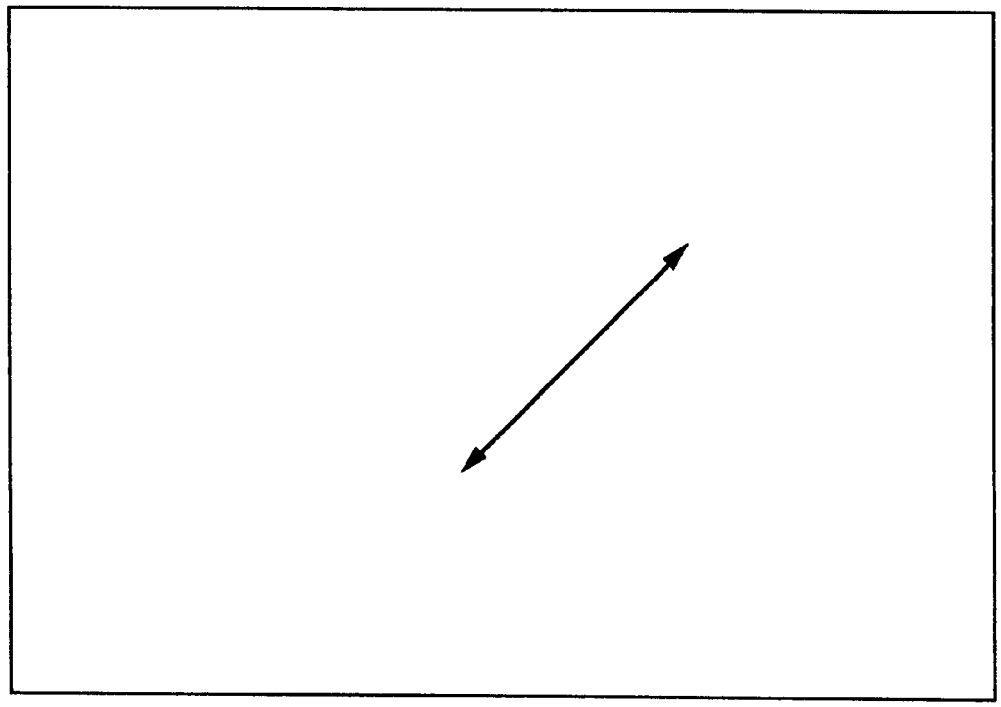

The moving distance of the hand 20 depends on the camera view angle and the distance between the camera 13 and the user 18. FIGS. 14 and 15 show a diagonal hand motion in the camera view. If the view angle is wide or the user 18 is at some distance from the camera 13, the corresponding distance moved by the cursor 24 on the display is relatively shorter than it would be if the view angle was not so wide or the user 18 was closer to the camera 13. (FIG. 14). If the view angle is narrow or the user 18 is too close to the camera 13, the hand motion distance is large. (FIG. 15). Assume that the cursor 24 sensitivity is fixed. In the former case, the cursor 24 moves little even if the user 18 makes a large motion of his or her hand 20. In the latter case, the cursor 24 is too sensitive and it moves a relatively large distance in response to a small hand motion.

To solve this problem, this system has an auto cursor sensitivity adjustment function. When the predetermined motion is small in the camera view, the CPU 16 moves the cursor 24 largely. When the predetermined motion is large in the camera view, the CPU 16 moves the cursor 24 a little. For example, in FIG. 14, assume that the predetermined hand motion is 50 pixels long. In this case, the CPU 16 makes the cursor 24 move 4 pixels when the hand 20 moves 1 pixel, i.e. the cursor motion is automatically scaled to the length of the detected hand motion. In FIG. 15, the predetermined hand motion is 200 pixels long. The cursor 24 should move 1 pixel for every one pixel of hand motion. If the user 18 wants to move the cursor 24 from the left side to the right side of the display, the user only should move the hand 20 almost the same distance regardless of the camera view angle or the user's position from the camera 13. This auto cursor sensitivity is implemented in the software of the CPU 16.

Figure 16:
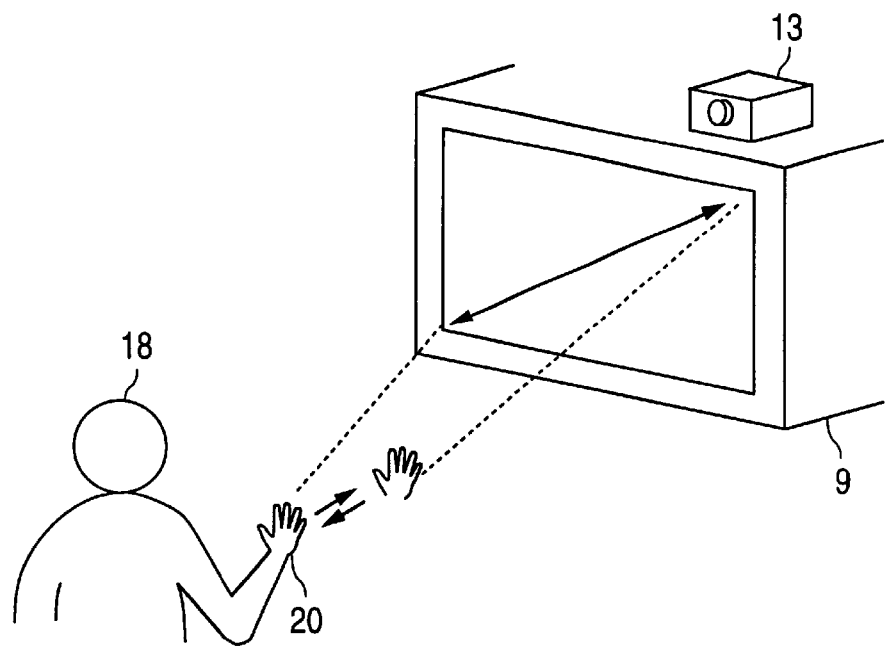
FIG. 16 is an illustration showing how the user cooperates in setting the automatic cursor sensitivity adjustment control.

Referring now to FIG. 16, when the user 18 makes a predetermined motion in the form of a diagonal hand movement, the motion detection system 15 locks onto the hand movement and moves the cursor 24 diagonally across the face of the TV screen. CPU 16 always calculates the ratio of the video frame diagonal distance to the distance of the hand stroke. The cursor is controlled proportionally to the ratio. If the user 20 controls the length of his or her hand movement to be constant, the CPU 16 is programmed to recognize this as the largest hand motion that needs to be detected and scales the corresponding movement of the cursor 24 so that it just spans the entire diagonal of the TV screen. This scale between the length of hand movement and the length of corresponding cursor movement is thereafter maintained for other hand movements. If the recognized diagonal hand stroke was ten inches, after the hand image is locked, the user 18 has to move the hand 20 ten inches diagonally in order to move the cursor from the lower left corner to the upper right corner on the CRT monitor 9. If the recognized diagonal hand stroke is 20 inches, the user has to move the hand 20 inches to move the cursor in the same way.

Instead of a cursor 24, a button may be highlighted like a digital satellite system graphical user interface (DSS GUI). When the hand 20 moves up, the upper button icon gets highlighted and so on. To choose the highlighted button, the user 18 holds the hand 20 on the button for some seconds. As used in this specification and claims, the term "cursor" is to be deemed to include any change in the TV display which tracks the movement of the user's detected motion, including such highlighting of button icons in correspondence to the motion of the user's hand.

Instead of motion vector detection, another image recognition scheme can be employed for this invention. For example, the motion detector circuit 15 may follow the tracks of skin color of the hand. If the track draws a circle, the motion detector circuit 15 judges that it is the hand image. Another way is to detect an outline of the hand with a pattern-matching scheme. The most important point of this invention is that a user does a special predetermined move so that the motion detector circuit 15 can easily distinguish it from other visually "noisy" moves.

This invention can be applied for not only digital TV, but also analog TV, PC video-phone, or any system that uses a camera and monitor display. Not only a CRT but also other kinds of displays (for example, an LCD, projection TV, etc.) can be used.

Figure 11:
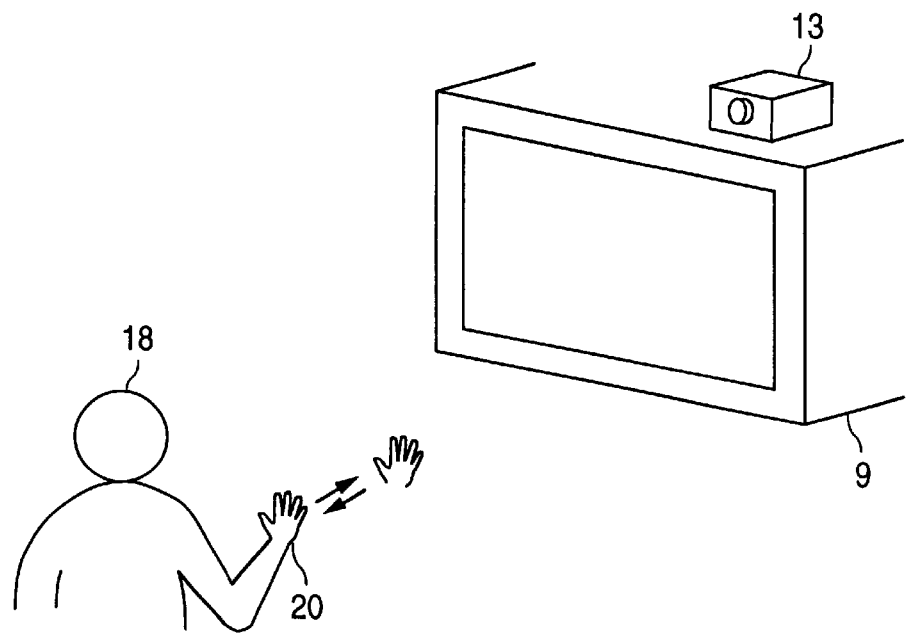
FIG. 11 is a diagrammatic illustration for use in explaining how the user uses another type of predetermined hand motion to cause the remote control system of FIG. 1 to recognize that a motion control signal is about to be made.

A video conference or telephone system uses an MPEG or H.261 video encoder. FIG. 11 shows a typical example of the encoder. The signal from camera 100 is sent via a subtraction node 101 to a DCT (Discrete Cosine Transform) block 102 for compression. In case of a predictive frame, before DCT processing, the signal is subtracted from reconstructed intra frame data in the subtraction block 101. After DCT processing, the signal is quantized in a circuit block 103 and output as a encoded stream. The output signal is also de-quantized in a circuit block 104 and uncompressed in an Inverse-DCT circuit 105. The uncompressed signal is passed through a summing block 106 and stored in a frame memory 107. In case of a predictive frame, reconstructed intra frame data is added to the uncompressed signal in the block 106.

The motion detector circuit 108 is connected to the frame memory 107, compares the past frame with the current frame and calculates a motion vector of each macro block. In this way motion vectors can be obtained. Therefore, with a small modification, i.e. detection of whether the vectors of a given region the motion detector circuit 108 can detect a circular hand motion. The motion detector circuit 108 sends the hand motion data to CPU 16. The rest of the blocks (blocks 1 to 12) are the same as in the embodiment of FIG. 1. Blocks 13 to 15 can be replaced with this modified encoder. By sharing the motion detection block with the encoder, a circuit size reduction and a cost reduction will be accomplished.

As an extended feature, if the camera is motor-driven, the CPU 16 can control the pan, tilt, or zoom of the camera automatically so that the hand image is positioned at the best place (usually the center) in the camera view.

This system does not require color signals. Therefore, for a dark place, an infrared camera 13 may be used.

If the CPU 16 connects with a network interface, for example a 1394 interface, this system can send hand position data and control another device through the network. This system does not have to be built into a TV set.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A remote control system for an electronic device, comprising:
    a display screen for displaying icons representing possible operations of the electronic device;
    a motion detector for detecting a motion within a field of view of the motion detector, the motion detector detecting a first predetermined motion of a moving object within the field of view to initiate remote control operation and, thereafter, tracking the movement of the object and outputting a cursor control signal representative of the motion of the object;
    a control circuit, connected to the display screen, the electronic device, and the motion detector and supplied with the cursor control signal, for controlling the display screen to display a movable visual indicator which tracks the movement of the moving object and for controlling the electronic device to perform operations corresponding to the icons selected by the user using the visual indicator.

2. A remote control system according to claim 1, wherein the motion detector detects the selection of an icon by the user by detecting a second predetermined motion pattern of the object when the visual indicator is coincident on the display screen with a particular icon.

3. A remote control system according to claim 2, wherein the second predetermined motion pattern is a cessation of movement of the object for a predetermined period of time after the visual indicator is coincident on the display screen with the particular icon.

4. A remote control system according to claim 1, wherein the motion detector includes a video camera.

5. A remote control system according to claim 1, wherein the visual indicator is a cursor.

6. A remote control system according to claim 1, wherein the electronic device is a television set.

7. A remote control system according to claim 1, wherein the display screen is a cathode ray tube.

8. A remote control system according to claim 1, wherein the moving object is a user's hand and the first predetermined motion is a circular hand movement.

9. A remote control system according to claim 1, wherein the motion detector includes a video camera and calculates a motion vector of each macro block between two adjacent video frames in a video output signal from the video camera.

10. A remote control system according to claim 9, wherein each video frame includes a plurality of blocks each containing vectors representative of detected motion of the object, wherein neighbor vectors with almost the same direction are grouped as one region.

11. A remote control system according to claim 10, wherein for each frame, the motion detector, in determining whether to track an object, checks each region to determine if that region satisfies the conditions (a) that the vector made one rotation clockwise or counterclockwise and (b) the region returned to the start position where it used to be and locks onto that region if conditions (a) and (b) are both satisfied.

12. A remote control system according to claim 1, wherein the motion detector includes a series connection of a video camera, a discrete cosine transform (DCT) circuit for discrete cosine transform processing a video signal output by the camera, a quantizing circuit for quantizing the DCT processed video signal, an invert-DCT circuit for invert DCT processing the DCT processed video signal, a frame memory supplied with the output of the invert DCT circuit, a subtraction node interposed between the camera and the DCT circuit for subtracting, in the case of a predictive frame, the camera's video signal from reconstructed intra frame data output from the frame memory, and a summing node interposed between the frame memory and the invert DCT processing, for adding, in the case of a predictive frame, reconstructed intra frame data output from the frame memory to the output signal from the invert DCT circuit, and a motion detection circuit connected to the frame memory which compares a past frame in the frame memory with a current frame in the frame memory and calculates a motion vector of each macro block between the past and current video frames.

13. A remote control system according to claim 12, wherein each video frame includes a plurality of blocks each containing vectors representative of detected motion of the object, wherein neighbor vectors with almost the same direction are grouped as one region.

14. A remote control system according to claim 13, wherein for each frame, the motion detector, in determining whether to track an object, checks each region to determine if that region satisfies the conditions (a) that the vector made one rotation clockwise or counterclockwise and (b) the region returned to the start position where it used to be and locks onto that region if conditions (a) and (b) are both satisfied.

15. A remote control system according to claim 1, further comprising a n automatic cursor sensitivity control means for automatically adjusting a length of movement of the visual indicator on the display screen relative to a corresponding length of movement of the moving object detected by the motion detector.

16. A remote control system according to claim 15, wherein the automatic cursor sensitivity control means adjusts the length of movement of the visual indicator on the display screen to move a fixed, predetermined distance on the display screen in response to the length of the detected first predetermined motion.

17. A remote controlling method for an electronic device, comprising the steps of:
   visually displaying on a display screen icons representing possible operations of the electronic device;
   detecting a motion within a field of view, including detecting a predetermined motion of a moving object within the field of view to initiate remote control operation and, thereafter, tracking the movement of the object an outputting a cursor control signal representative of the motion of the object;
   as a function of the control signal, controlling the display screen to display a movable visual indicator which tracks the movement of the moving object and the electronic device to perform operations corresponding to the icons selected by the user using the visual indicator.

18. A remote controlling method according to claim 17, wherein the step of detecting the selection of an icon by the user includes detecting a predetermined motion pattern of the object when the visual indicator is coincident on the display screen with a particular icon.

19. A remote controlling method according to claim 17, wherein the step of detecting the selection of an icon by the user includes detecting a cessation of movement of the object for a predetermined period of time after the visual indicator is coincident on the display screen with a particular icon.

20. A remote controlling method according to claim 17, wherein the visual indicator is a cursor.

21. A remote controlling method according to claim 17, wherein the electronic device is a television set.

22. A remote controlling method according to claim 17, wherein the step of displaying includes displaying on a cathode ray tube.

23. A remote controlling method according to claim 17, wherein the predetermined motion is a circular hand movement.

24. A remote controlling method according to claim 17, wherein the motion detecting step uses a video camera.

25. A remote controlling method according to claim 24, wherein the motion detecting step includes calculating a motion vector of each macro block between two adjacent video frames in a video output signal from the video camera.

26. A remote controlling method according to claim 25, wherein each video frame includes a plurality of blocks each containing vectors representative of detected motion of the object, wherein neighbor vectors with almost the same direction are grouped as one region.

27. A remote controlling method according to claim 26, further comprising the steps, for each frame, of determining whether to track an object by checking each region to determine if that region satisfies the conditions (a) that the vector made one rotation clockwise or counterclockwise and (b) the region returned to the start position where it used to be and locking onto that region if conditions (a) and (b) are both satisfied.

28. A remote controlling method according to claim 24, wherein the motion detecting step takes place as part of a process of encoding the video output signal from the video camera according to the motion picture experts group (BPEG) standard and includes calculating a motion vector of each macro block between a past video frame and a current video frame in video output signal from the video camera.

29. A remote controlling method according to claim 28, wherein each video frame includes a plurality of blocks each containing vectors representative of a detected motion of the object, wherein neighbor vectors with almost the same direction are grouped as one region.

30. A remote controlling method according to claim 28, further comprising the steps, for each frame, of determining whether to track an object by checking each region to determine if that region satisfies the conditions (a) that the vector made one rotation clockwise or counterclockwise and (b) the region returned to the start position where it used to be and locking onto that region if conditions (a) and (b) are both satisfied.

31. A remote controlling method according to claim 17, further comprising the step of automatically adjusting a length of movement of the visual indicator on the display screen relative to a corresponding length of the detected movement of the moving object.

32. A remote controlling method according to claim 31, wherein during the step of automatically adjusting the length of movement of the visual indicator on the display screen includes moving the visual indicator a fixed, predetermined distance on the display screen in response to the length of the detected first predetermined motion.

33. An apparatus for producing a device control signal, comprising:
   a display configured to show a cursor and an icon representing a device operation, the icon and the cursor each having a position within the display;
   a motion detector configured to detect a predetermined start motion of an object to initiate remote control operation and thereafter to track a movement of the object, and configured to produce a cursor control signal based on the movement;
   a cursor circuit configured to alter a cursor position based on the cursor control signal; and
   a select circuit configured to detect, based on the positions of the icon and the cursor, a selection of the icon and to produce a device control signal based on the selection.

34. The apparatus of claim 33, further comprising an electronic device configured to receive the device control signal and to perform an operation based thereon.

35. The apparatus of claim 33, wherein the select circuit is further configured to detect the selection of the icon based on the cursor position, the icon position and the cursor control signal indicating that the object has moved according to a first motion.

36. The apparatus of claim 35, wherein the first motion is predetermined.

37. An apparatus for producing a device control signal, comprising:
   a means for displaying a cursor and an icon representing a device operation, the icon and the cursor each having a position within the display; and a means for detecting a predetermined start motion of an object to initiate remote control operation and thereafter to track a movement of the object, for producing a cursor control signal based on the movement; for altering a cursor position based on the cursor control signal; for selecting the icon based on the positions of the icon and the cursor, and for producing a device control signal based on the selection.

38. A method of producing a device control signal, comprising:

displaying a cursor and an icon representing a device operation, the icon and the cursor each having a position;

detecting a predetermined start motion of an object to initiate remote control operation and thereafter tracking a movement of the object;

producing a cursor control signal based on the movement;

altering a cursor position based on the cursor control signal;

selecting the icon based on the positions of the icon and the cursor; and producing a device control signal based on the selecting.

39. Computer software, written on computer-readable media, for generating an executable program from a source program, comprising instructions configured to:

display a cursor and an icon representing a device operation, the icon and the cursor each having a position;

detect a predetermined start motion of an object to initiate remote control operation and thereafter to track a movement of the object;

produce a cursor control signal based on the movement;

alter a cursor position based on the cursor control signal;

select the icon based on the positions of the icon and the cursor; and produce a device control signal based on the selection.

* * * * *

UNITED STATES PATENT AND TRADEMARK OFFICE
CERTIFICATE OF CORRECTION

PATENT NO.   : 6,501,515 B1
DATED        : December 31, 2002
INVENTOR(S)  : Iwamura It is certified that error appears in the above-identified patent and that said Letters Patent is hereby corrected as shown below:

<u>Column 9,</u>
Line 5, change "a n" to -- an --.
Line 24, change "an" to -- and --.

<u>Column 10,</u>
Line 9, change "(BPEG)" to -- (MPEG) --.

Signed and Sealed this

Third Day of June, 2003

JAMES E. ROGAN
*Director of the United States Patent and Trademark Office*